United States Patent
Hunt et al.

(10) Patent No.: US 6,844,894 B1
(45) Date of Patent: Jan. 18, 2005

(54) IMAGE PROCESSING

(75) Inventors: Stuart William Arundell Hunt, Hertford (GB); Keith Williams, Earley (GB); Andrew Kevin Howard, Addlestone (GB)

(73) Assignee: Ascent Media Group, Inc., Santa Monica, CA (US)

( * ) Notice: Subject to any disclaimer, the term of this patent is extended or adjusted under 35 U.S.C. 154(b) by 0 days.

(21) Appl. No.: 09/031,779

(22) Filed: Feb. 27, 1998

(30) Foreign Application Priority Data

Feb. 27, 1997 (GB) .............................................. 9704052

(51) Int. Cl.⁷ .............................................. H04N 5/253
(52) U.S. Cl. .................................................... 348/96
(58) Field of Search ............................ 348/96, 97, 91, 348/100, 107, 110; H04N 5/253

(56) References Cited

U.S. PATENT DOCUMENTS

| | | | | |
|---|---|---|---|---|
| 4,974,064 A | * | 11/1990 | Tsinberg ..................... | 348/489 |
| 5,023,711 A | * | 6/1991 | Erhardt ....................... | 358/506 |
| 5,057,924 A | * | 10/1991 | Yamada et al. .......... | 348/231.6 |
| 5,260,787 A | * | 11/1993 | Capitant et al. ............ | 348/459 |
| 5,517,241 A | * | 5/1996 | Adachi et al. ........... | 348/231.7 |
| 5,557,322 A | * | 9/1996 | Millward .................... | 348/100 |
| 5,821,991 A | * | 10/1998 | Kwok ......................... | 348/96 |
| 5,841,480 A | * | 11/1998 | Rhodes ....................... | 348/459 |
| 5,847,754 A | * | 12/1998 | Thornton .................... | 348/97 |
| 5,881,205 A | * | 3/1999 | Andrew et al. ............ | 386/129 |
| 6,075,887 A | * | 6/2000 | Brett .......................... | 382/167 |

FOREIGN PATENT DOCUMENTS

| | | |
|---|---|---|
| GB | 2119599 | 11/1983 |
| GB | 2243264 | 10/1991 |

* cited by examiner

*Primary Examiner*—Nhon Diep
(74) *Attorney, Agent, or Firm*—O'Melveny & Myers LLP

(57) ABSTRACT

A method of and an apparatus for the conversion of cinematographic film to corresponding video data, in which the transport mechanism 3a of a telecine machine 2a is operated at a rate higher than the real time frame rate for the film to be converted. The stream of video data from the telecine machine 2a is processed by a video processor 13 and stored in a buffer 15. The video data can be downloaded from the buffer 15 at a data rate corresponding to the real time data rate of the film.

24 Claims, 6 Drawing Sheets

IMAGE PROCESSING

FIELD OF THE INVENTION

The present invention relates to image processing, and in particular to the processing of cinematographic film to produce electrical signals, preferably in the form of digital data, corresponding to the image stored on the film.

BACKGROUND ART

There exist a number of known systems for converting the content of cinematographic film into electrical signals for storage on video tape or for broadcast as television signals. Machines for carrying out this process, known as telecine machines, are widely available. Examples of such machines are the URSA GOLD from Cintel International Limited of Ware, Hertfordshire, England or the FDL 90 telecine manufactured by Broadcast Television Systems of Darmstadt, Germany.

A typical telecine machine comprises a film transport mechanism which transports a length of film at a constant predetermined rate of typically 24 or 30 frames per second past a scanning system. The frame rate at which the film is transported is the telecine machine is the rate at which the film frames are replayed for real time viewing of the film, i.e the real time frame rate. The scanning system produces electrical signals corresponding to the content of the film which are then processed to give television signals which may be recorded on video tape or directly broadcast. A number of scanning systems are available; for example the scanning system in the URSA GOLD uses a cathode ray tube to produce a flying spot of light, the position of which may be controlled by a digitally addressable scanning system. In this system, the light from the flying spot transmitted by the film is detected by a number of photomultiplier tubes which convert the intensity of the light into a corresponding electrical signal.

An alternative scanning system is that used for example in the FDL 90, which comprises a linear array of charge coupled devices (CCDs) which record the light transmitted by the film at points in a line spanning the film frame and orientated transverse to the transport direction. The movement of the film past the CCD array by the transport mechanism allows the CCD array to scan the whole length of the film.

The above two examples of telecine machines operate in Standard Definition, in common with the vast majority of broadcast television and video tape systems. This terminology is used, in Europe, to describe a picture format consisting of 625 picture lines, 576 of which are active, each line comprising 720 picture samples, the repetition rate being 25 frames per second, which is equivalent to 50 fields per second. In North America, the Standard Definition format is defined by 525 picture lines, of which 486 are active, each comprising 720 picture samples with a repetition rate of 30 frames (60 fields) per second. The standards are documented in Recommendation 601 of the CCIR, ratified at the 16th Plenary Assembly in Dubrovnik in 1986. The sampling frequency for European Standard Definition television data is 13.5 MHz resulting in a raw data stream of 260 megabits per second.

Other telecine machines exist, such as the MK III HD from Cintel International Limited or the FLH-1000 from Broadcast Television Systems, which produce High Definition television signals. High Definition television is a standard which has not yet been widely introduced for television broadcasts but is in various stages of development and prototype trial. The proposed European standard is for a system of 1250 lines of which 1152 are active, each comprising 1920 picture samples with a repetition rate of 25 frames (50 fields) per second. Thus, the sampling frequency of this system is 72 MHz resulting in a raw data stream of 1152 megabits per second. Thus the ratio of the data rates of high definition telecine systems to standard definition telecine systems is 16:3 (5.33) and thus the data rate of high definition systems is typically in excess of 5 times that of standard definition.

In order to allow existing standard definition telecine machines to produce high definition television signals there have been proposed a number of systems for producing high definition signals from standard definition systems. An example of such a system is disclosed in GB-A-2243264 (Rank Cintel Limited). According to this system each film frame is repetitively scanned to produce a plurality of interlaced scans. Each interlaced scan can be processed by a standard definition processing system at a standard definition data rate of 216 megabits per second, which requires no increase in bandwidth of the standard definition processing apparatus. The scans are combined to produce a high definition signal. Of course, the data content of a high definition picture is 5.33 times larger than that of a standard definition picture and thus it takes 5.33 times longer for this system to produce a high definition signal than it would to produce a standard definition signal from the same film frame.

It is customary to operate telecine machines in a real time mode such that the resultant signals are produced at the broadcast data rate. Thus according to the system of GB-A-2243264, it takes 5.33 times longer than real time to transfer a given piece of programme material from film to video or into broadcast signals at high definition. For example, a three hour piece of film will take 16 hours to transfer.

As mentioned above, the high definition television standard is currently at a prototype stage and thus there is little demand for the transfer of film material into high definition television signals because of the limited distribution channels that are currently available. Commercially, telecine apparatus is expensive both to buy and to hire, particularly in the case of telecine apparatus that can operate at the high definition data rate of 1152 megabits per second. In order to increase the utilisation, and therefore the revenue gained from, a high definition telecine machine certain manufacturers offer the facility of producing standard definition signals from a high definition telecine machine. This is usually achieved by scanning the film material at the high definition sampling rate and averaging down the resultant data to produce a standard definition signal. Of course, the use of a telecine machine capable of producing high definition signals to produce signals at standard definition is financially disadvantageous, as the price and running costs of a high definition system are typically three times that of a standard definition system, yet the financial return from a high definition system operating in this mode will only be equivalent to that from a cheaper standard definition machine.

SUMMARY OF THE INVENTION

According to a first aspect of the present invention there is provided a method of processing a continuous sequence of frames of cinematographic film to produce video signals corresponding to the images stored on the film, wherein the sequence of frames is scanned by a telecine machine at a frame rate faster than the real time frame rate to produce a stream of video data corresponding to the images stored on the film at a data rate greater than the real time data rate, which video data stream is supplied to a buffer, and the video data is output from the buffer at the real time video data rate.

Thus by means of tile invention, film material can be transferred to video tape or prepared for broadcast in less time than would be required to view the sequence of film frames. In this way, a telecine machine operating in accordance with the invention may be utilised more cost effectively than a telecine machine in which the film transport operates at the real time rate.

From a second aspect the invention provides a telecine machine comprising a transport mechanism adapted to transport film at a frame rate greater than the real time frame rate and a buffer adapted to receive video data at a data rate faster than the real time video data rate and to output the video data at the real time video data rate.

A suitable buffer for use in accordance with the invention is, for example, digital memory or magnetic or optical storage media. A suitable medium is, for example, the D5 tape standard from the Panasonic Corporation of Japan, which is capable of recording picture data at the high definition data rate. Further examples are the digital tape standards, such as the DST from Ampex. The digital data may be downloaded from the buffer, such as random access memory or a disk array, onto conventional video tape or other suitable storage media or to a broadcast system. This operation may be carried out in real time at the required resolution of the resultant image signals. A major advantage of such a system is that during this downloading operation the apparatus for converting the film to digital data, such as a telecine machine, is available for other revenue creating work.

The transport rate and data rate may be for example 1.5, 2, 3, 4 or 5 times that of the real time rate, or even more. Thus, at any given increase in transport rate over the real time rate, a corresponding saving in transfer time will be achieved. There is no limit to the rate at which the transport mechanism may be operated according to the invention, except for the practical requirements of constructing the transport to operate at very high rates.

The video data may be analogue or digital although digital data is preferred, as it allows more flexibility in subsequent processing. The data channels of the telecine machine must be capable of handling the video data, for example digital data, at the higher rate at which it is produced by the scanning system of the telecine. For a given desired resolution of the scanning of the film frame, the increase in transport rate will result in a corresponding increase in the data rate from the telecine machine. Consequently, the data channels from the telecine machine will require a corresponding increase in bandwidth. This may be achieved by using a single channel of increased bandwidth or by multiplexing a number of channels of conventional bandwidth. The data channel may comply with a computer bus standard such as the Ultra-SCSI standard or comprise a plurality of channels of a lower bandwidth bus standard. Fibre optic transfer may be used between the telecine machine and the buffer and the transfer may utilise the asynchronous transfer mode (ATM) protocol.

The buffer may comprise a plurality of discrete stores. The stream of video data may be supplied sequentially to each store, for example by means of a high bandwidth link. Alternatively, the stream of video data may be decomposed into a plurality of sub-streams of data. Each sub-stream of data, which may contain only a proportion of the information in the stream of video data and therefore require a much lower bandwidth, may be supplied simultaneously to a respective store.

Preferably, processing means are provided for processing the video data from the telecine machine to produce a desired output. For example, the processing means may perform the multiplexing operation described above. The processing means may be arranged to operate on the content of the electrical signals to produce a desired effect, in a process commonly known as "grading".

According to the invention the transfer times for telecine machines are reduced which results in a considerable increase in the efficiency of film to video transfer.

BRIEF DESCRIPTION OF THE DRAWINGS

Some embodiments of the invention will now be described by way of example only and with reference to the accompanying figures in which.

In the figures, like reference numerals have been accorded to like elements of the systems shown.

DETAILED DESCRIPTION OF THE EMBODIMENTS

Figure 1:
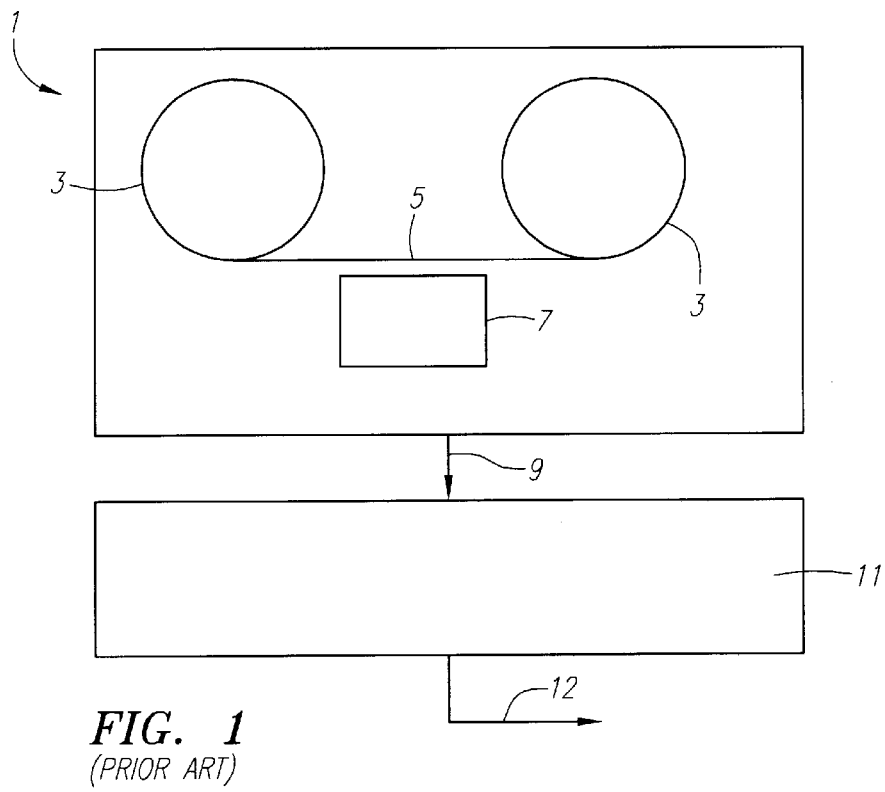
FIG. 1 shows a standard definition telecine machine according to the prior art.

FIG. 1 shows a standard definition telecine machine 1 according to the prior art, such as the URSA GOLD machine or the FDL 90. The telecine comprises a film transport mechanism 3 for transporting a length of film 5 past a scanning system 7, which operates at the standard definition resolution of 625 lines by 720 picture elements. The transport mechanism 3 moves the film past the scanning system 7 at a rate of either 24 or 30 frames per second, whichever is the rate at which the film will be viewed in real time. The scanning system is either a digitally addressable flying spot system, in the case of the URSA GOLD, or a CCD array, in the case of the FDL 90. The scanning system converts light from the images stored on the film 5 into electrical signals which are output at channel 9 to a data processing system 11. The data processing system operates on the electrical signals to produce a video data stream at a rate of 216 Mbits per second at output 12.

Figure 2:
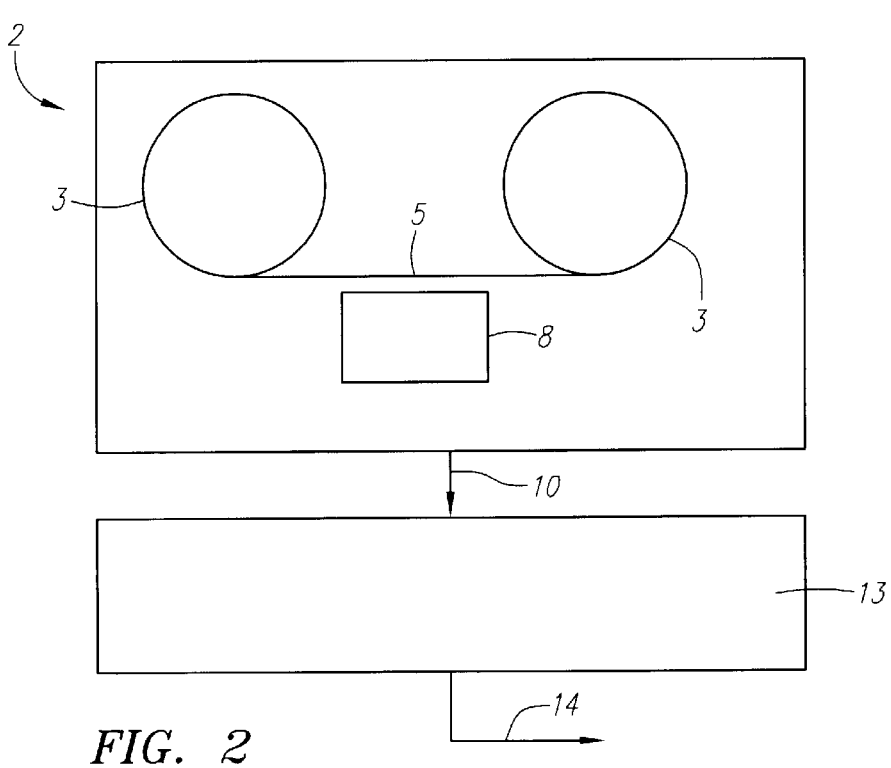
FIG. 2 shows a high definition telecine machine according to the prior art.

FIG. 2 shows a high definition telecine machine 2 according to the prior art, such as the MK III HD machine or the FLH-1000. The telecine 2 comprises a film transport mechanism 3 for transporting a length of film 5 past a scanning system 8, which operates at the high definition resolution of 1250 lines by 1920 picture elements. The transport mechanism 3 moves the film past the scanning system 8 at a rate of either 24 or 30 frames per second, whichever is the rate at which the film will be viewed in real time. The scanning system converts light from the images stored on the film 5 into electrical signals which are output at channel 10 to a high definition data processing system 13. The data processing system 13 operates on the electrical signals to produce a high definition video data stream at a rate of 1152 Mbits per second at output 14. The principle of operation of the high definition telecine 2 and the standard definition telecine 1 are equivalent except for the increased resolution and higher resultant data rate of the high definition system. These systems are well known in the art.

Figure 3:
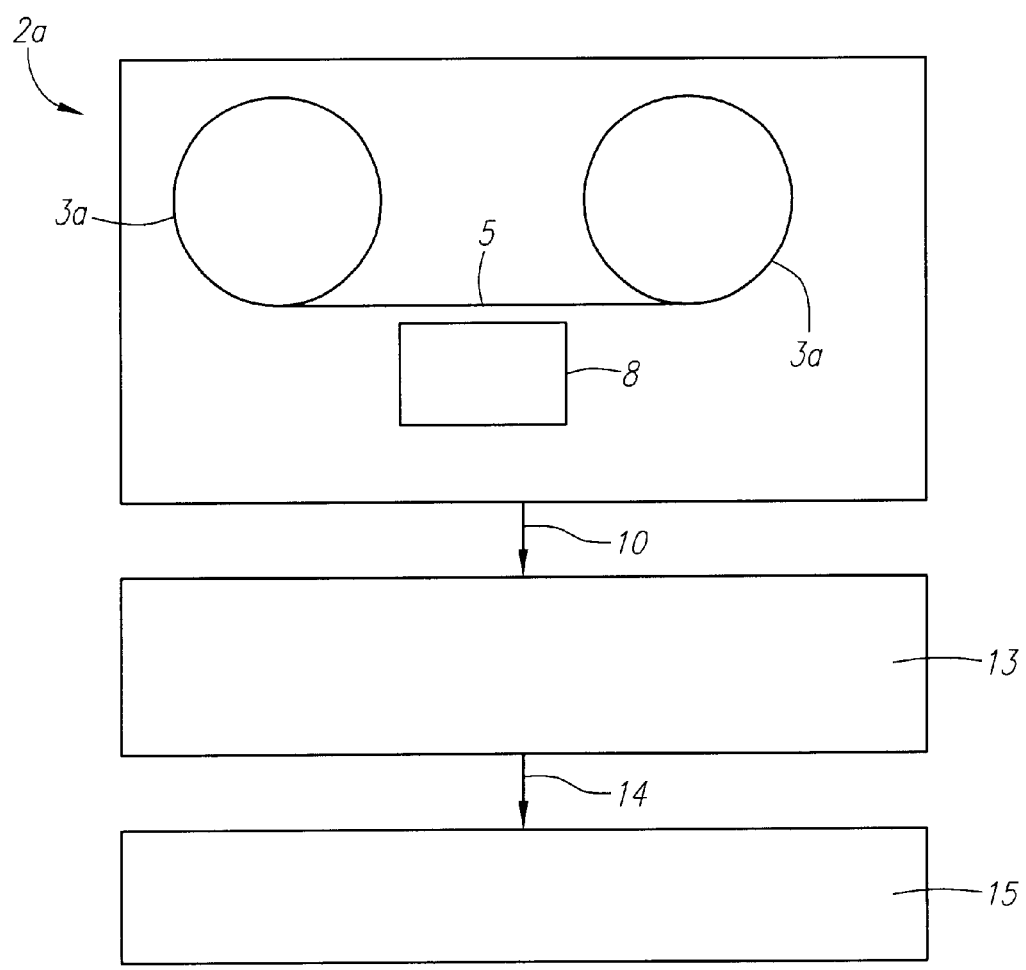
FIG. 3 shows a high definition telecine machine operating in accordance with the present invention.

FIG. 3 shows a high definition telecine machine 2a adapted in accordance with the invention and thereby arranged to produce television signals at standard definition data rates. The telecine 2a comprises a film transport mechanism 3a which differs from the transport mechanism 3 of the prior art machines 1, 2 in that it transports the film 5 past the scanning system 8 at a rate higher than the rate for viewing the film in real time. In this embodiment the transport rate is up to 5.33 times the real time rate, i.e. up to 128 or 160 frames per second. The scanning system 8 of this embodiment is capable of operating at the high definition resolution of 1250 lines by 1920 picture elements, but in adjusted to operate at the standard definition resolution of 625 lines by 720 picture elements. The scanning system converts light from the images stored on the film 5 into electrical signals in the same way as known systems, but the increased rate of the transport mechanism means that the data which is output at channel 10 is at a data rate or up to 5.33 times the standard definition data rate, i.e. up to 1152 Mbits per second. The data from channel 10 is passed to a high definition data processing system 13. The data processing system 13 operates on the data to produce a data stream of standard definition video data at an accelerated rate of up to 1152 Mbits per second at output 14. The video data is passed to a data store 15 such as a solid state video recorder comprising a large amount of random access memory, for example the device commercially available from Questech Limited of Woking, Berkshire, or an array of magnetic disks as are used commonly in computer systems. Such an array of magnetic disks may be configured by the user for the system, but is also available pre-packaged from suppliers such as Sierra Design Labs of Incline Village, Nev., USA.

Figure 4:
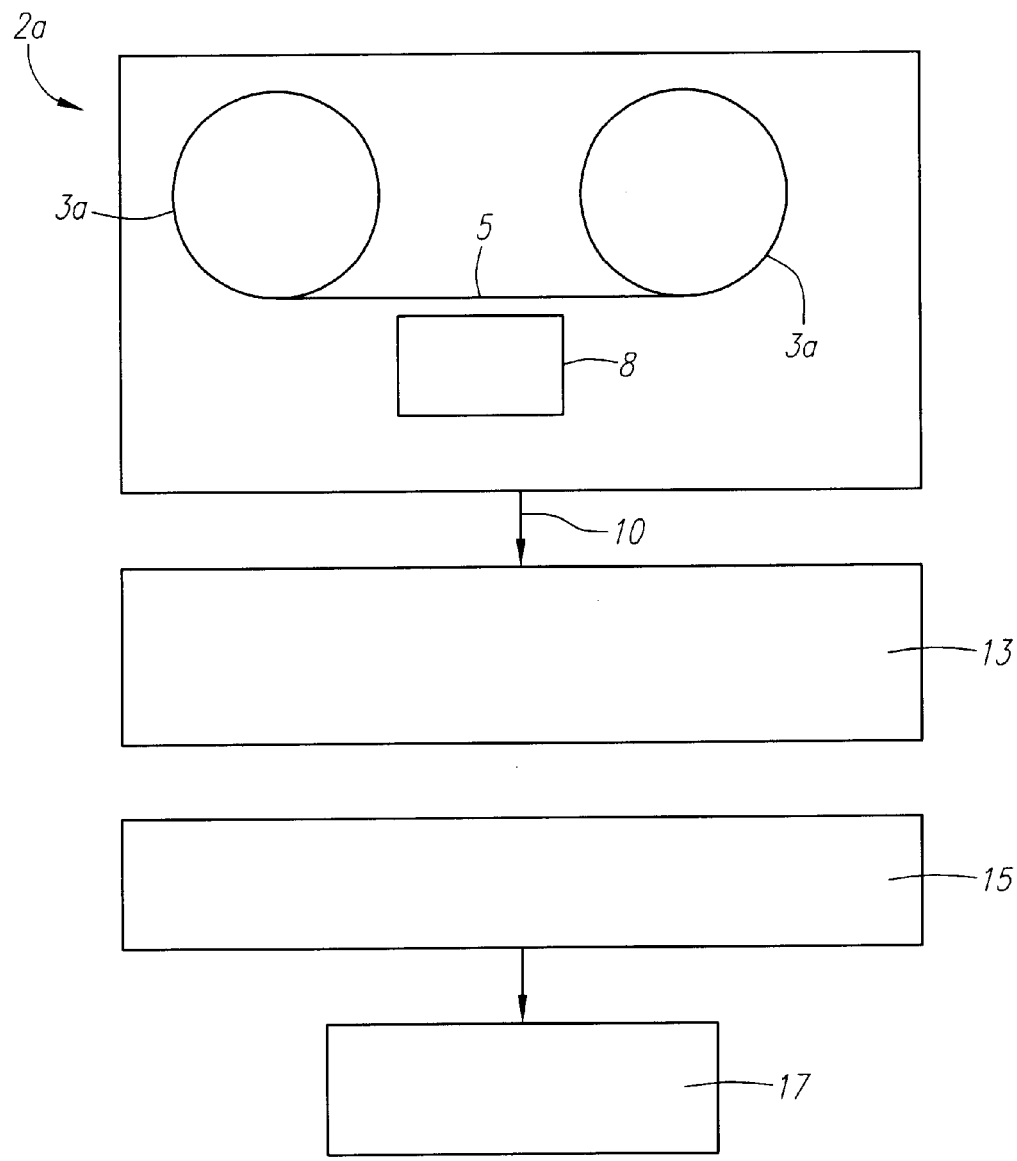
FIG. 4 illustrates the transfer of data from a buffer onto video storage means in accordance with the present invention.

As shown in FIG. 4, the data from the store 15 is then subsequently downloaded to a magnetic storage medium 17, such as videotape, in real time at standard definition and at a standard definition real time data rate of up to 216 Mbits per second. The data store 15 is only necessary according to the present invention because current digital videotape machines are unable to accept and record a stream of video data at a data rate higher than the real time data rate. Thus, if a video data storage medium is available that can record video data at an accelerated data rate, the buffer of the present invention is unnecessary, as the video data from the telecine machine may be recorded directly.

During the downloading process, the telecine machine 2a is not required and thus can be used for other work.

According to this embodiment, therefore, a standard film transport rate of 24 or 30 film frames per second is increased to up to 128 or 160 film frames per second. In this way, 16 hours of film could be converted to video data at standard definition in three hours. This reduction in the time spent on such conversions makes the telecine machine adapted in accordance with the invention available for use on other revenue returning work. The downloading process will necessarily take 16 hours in the above example, but during this time the expensive telecine machine is not required.

Figure 5:
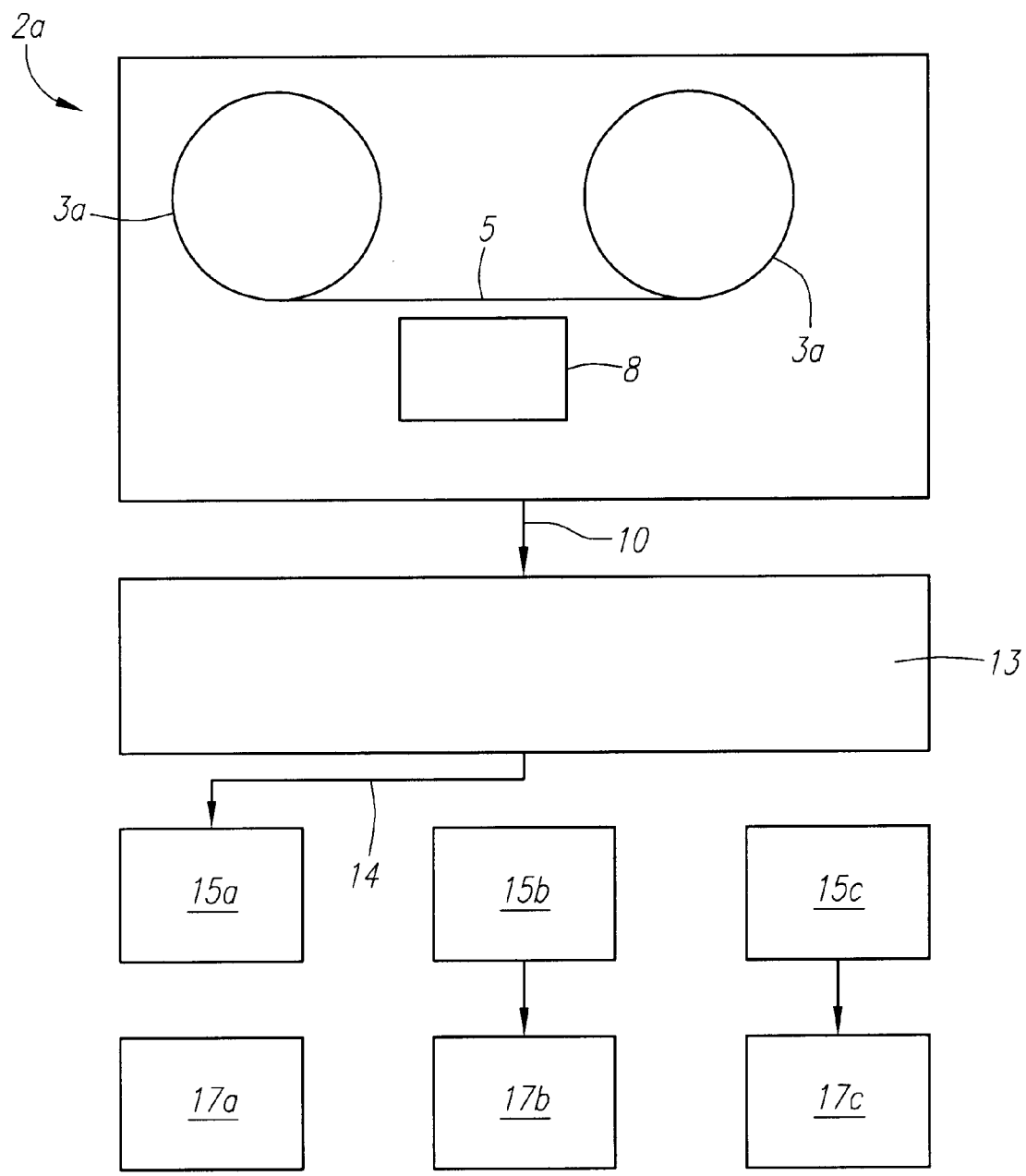
FIG. 5 shows a further embodiment of the invention.

In the embodiment of FIG. 5, a high definition telecine machine 2a is connected to five disk buffers 15a–15c, of which only three are shown in the figure. Each disk buffer is connected to a respective standard definition video tape machine 17a–17c. The disk buffers 15a–15c respectively receive data at up to 1152 Mbits per second through output 14. As one buffer 15a becomes full, output 14 is switched to the next buffer. Thus, in this embodiment, it is possible to transfer five one hour episodes of film material to standard definition video tape in one hour, by running the telecine transport at five times the real time rate. However, with a conventional standard definition telecine machine this would take at least five hours, as would also be the case with a conventional high definition telecine machine. According to this embodiment, on the other hand, each one hour film episode is transferred at five times the real time rate to a respective disk buffer 15a–15c, the resultant digital data rate being equivalent to that of high definition data, but representing standard definition frames. Each episode can be transferred to a disk array in typically 12 minutes and thus at the end of one hour all of the episodes will be transferred onto respective disk arrays. It will of course take one further hour for the content of each disk array 15a–15c to be copied onto video tape at each of the standard definition video tape machines 17a–17c, but the high definition telecine machine 2a which is the most expensive component in the process will be free to undertake further work and thus its productivity will be greatly increased.

In practical systems five disk arrays 15a–15c and five video tape machines would not typically be necessary, as there is generally a delay in setting up an individual roll of film 5 for optimum transfer. For example, commonly each scene on the roll of film is previewed and the optimum reproduction characteristics for that scene are selected. This process is known as grading. After each scene on the roll has been graded then the transfer can take place. However, the grading operation typically takes considerably longer than the actual transfer time for a conventional telecine system. For example the grading process for a one hour episode may take two hours followed by a one hour transfer, in a conventional system. In the example described above in relation to the embodiment of FIG. 5, the grading operation may still take two hours but the transfer time will only take 12 minutes. Thus the operator making the grading decisions may begin grading the next roll of film during the one hour necessary to copy the digital data from the disk array 15 to the video tape machine 17. In this way only one disk array 15 and video tape machine 17 are required.

Figure 6:
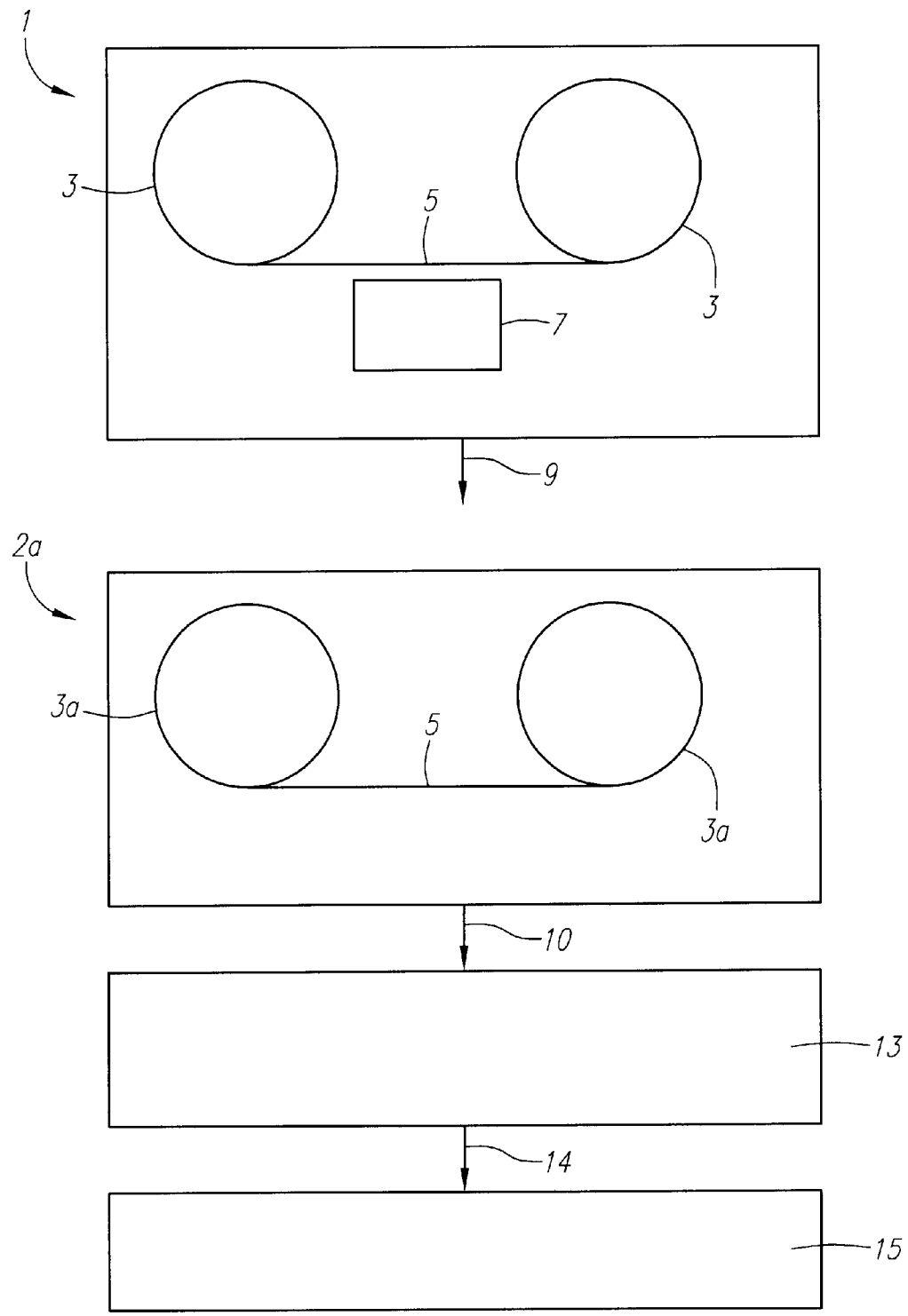
FIG. 6 shows yet another embodiment of the invention.

As a further development of this system, shown in FIG. 6, grading decisions may be made on a standard definition telecine machine 1. When the grading decisions have been made the film material 5 together with the scene by scene grading data may be moved over to a high definition telecine 2a for transfer. Thus the cheaper standard definition telecine machine 1 may be used for making the grading decision rather than an expensive machine which is used for transfer.

Various combinations of use of standard definition telecine machines 1,1a and high definition telecine machines 2,2a, each of which may be adapted in accordance with the invention are possible. In general, depending on the quality of work desired and thus the amount of grading relative to the time taken for the transfer of the material from film by the telecine machine the usage of standard definition telecines and high definition telecines and appropriate numbers of disks array 15 and video tape machines 17 may be optimised.

Figure 7:
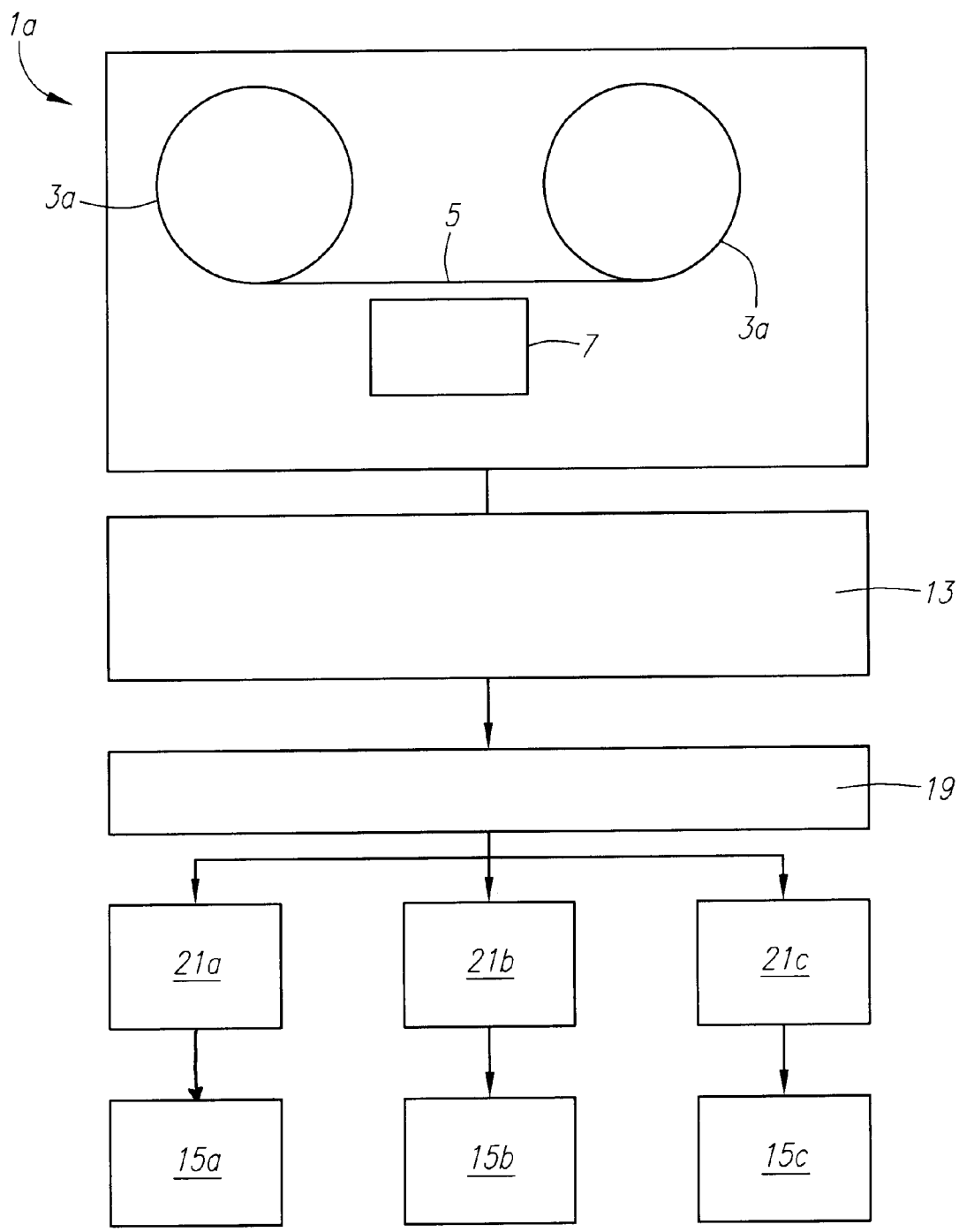
FIG. 7 shows yet another embodiment of the present invention.

In an alternative embodiment of the invention, shown in FIG. 7 a standard definition telecine machine 1a may be adapted in accordance with the invention. In this case, the film transport mechanism 3a of the standard definition telecine machine may be adapted to enable transfer at greater than 24 or 30 frames per second, and the data processing system 11 of the telecine machine may be adapted to facilitate data transfer at a greater rate than the standard definition rate of 216 megabits per second. For example, the data processing channel 11 from the standard definition telecine 1a may be replaced with the data processing channel 13 from a high definition telecine 2. This is advantageous for the present system in that in a high definition telecine 2 the scanning system 8 will be arranged to scan at the high definition resolution, whereas according to the present invention this is not required and thus the scanning system 7 of such a hybrid telecine machine may be that of a standard definition telecine 1. For example, in the case of a CCD scanning system it would be unnecessary to have a high definition CCD array which would save cost.

Furthermore, as shown in FIG. 7 rather than using a single high bandwidth data processing channel, a plurality of standard definition bandwidth data processing channels 21a–21b may be used in parallel and the data stream at the high definition data rate may be multiplexed by a multiplexer 19 into a plurality of standard data rate streams. The data from each of the standard definition data processing channels 21a–21b may then be passed to respective standard definition disk arrays 15a–15c. The data may then be recombined from these disk arrays 15a–15c and downloaded onto videotape, for example.

Although there have been described herein what are considered currently to be the preferred embodiments of the present invention, it will be apparent to those skilled in the art that there exist many alternative means and methods which may be employed equivalently without departing from the scope of the invention.

What is claimed is:

1. A method of processing a continuous sequence of frames of cinematographic film to produce video signals corresponding to the images stored on the film, the method comprising the steps of:

providing a telecine having a horizontal scan rate greater than the product of the real time frame rate and the desired number of output lines per frame, transporting the film through the telecine at a frame rate faster than the real time frame rate, thereby producing a stream of video data corresponding to the images stored on the film, supplying the video data stream to a buffer, and outputting the video data from the buffer at the desired number of output lines per frame.

2. The method as claimed in claim 1, wherein the buffer comprises a plurality of discrete stores and the stream of video data is supplied sequentially to each store.

3. The method as claimed in claim 1, wherein the buffer comprises a plurality of discrete stores and the stream of video data is decomposed into a plurality of substreams of data, each of which is supplied simultaneously to a respective store.

4. The method as claimed in claim 1, 2 or 3, wherein the video data is digital data.

5. The method as claimed in claim 4, wherein the buffer comprises digital memory.

6. The method as claimed in claim 4, wherein the buffer comprises a magnetic storage medium.

7. The method as claimed in claim 4, wherein the buffer comprises an optical storage medium.

8. A telecine machine for processing a continuous sequence of frames of ciematographic film to produce video signals corresponding to the images stored on the film, comprising:

a scanning system for scanning the film at a horizontal scan rate which is greater than the product of the real time frame rate times the desired standard number of lines per frame, a transport mechanism adapted to transport film at a frame rate greater than the real time frame rate, and a buffer adapted to receive video data at a data rate faster than the real time video data rate and to output the video data at the desired standard number of lines per frame.

9. The telecine machine as claimed in claim 8, wherein the buffer comprises a plurality of discrete stores and the stream of video data is supplied sequentially to each store.

10. The telecine machine as claimed in claim 8, wherein the buffer comprises a plurality of discrete stores and the stream of video data is decomposed into a plurality of sub-streams of data, each of which is supplied simultaneously to a respective store.

11. The telecine machine as claimed in claim 8, 9 or 10, wherein the video data is digital data.

12. The telecine machine as claimed in claim 11, wherein the buffer comprises digital memory.

13. The telecine machine as claimed in claim 11, wherein the buffer comprises a magnetic storage medium.

14. The telecine machine a claimed in claim 11, wherein the buffer comprises an optical storage medium.

15. A method of processing a sequence of frames of film to produce video signals corresponding to the images stored on the film, the method comprising the steps of:

scanning the sequence of frames by a high definition telecine machine at a frame rate faster than the real time frame rate, producing a stream of video data corresponding to the images stored on the film, supplying the video data stream to one or more buffers, and outputting the video data from the buffers in standard definition from the buffers.

16. The method as claimed in claim 15, wherein the buffers comprise a plurality of discrete stores and the stream of video data is supplied sequentially to each store.

17. The method as claimed in claim 15, wherein the buffers comprise a plurality of discrete stores and the stream of video data is decomposed into a plurality of substreams of data, each of which is supplied simultaneously to a respective store.

18. The method as claimed in claim 15, wherein the video data is digital data.

19. The method as claimed in claim 18, wherein the buffers comprise digital memory.

20. The method as claimed in claim 18, wherein the buffers comprise a magnetic storage medium.

21. The method as claimed in claim 18, wherein the buffers comprise an optical storage medium.

22. The method as claimed in claim 1 wherein the telecine is a high definition telecine.

23. The method as claimed in claim 22 wherein the telecine has a horizontal scan rate of substantially 1250 lines.

24. The method as claimed in claim 1 wherein the film is transported through the telecine at substantially twice the real time frame rate.

* * * * *